No. 801,804. PATENTED OCT. 10, 1905.
H. P. MAXIM & H. W. ALDEN.
AXLE END.
APPLICATION FILED JAN. 15, 1902.

Witnesses
M. Penderell Walker
W. H. Barker.

Inventors.
H. Percy Maxim,
Herbert W. Alden
by their attorney
Herman Kuntz

UNITED STATES PATENT OFFICE.

HIRAM PERCY MAXIM, OF PITTSBURG, PENNSYLVANIA, AND HERBERT W. ALDEN, OF HARTFORD, CONNECTICUT, ASSIGNORS TO ELECTRIC VEHICLE COMPANY, OF JERSEY CITY, NEW JERSEY, A CORPORATION OF NEW JERSEY.

AXLE-END.

No. 801,804.      Specification of Letters Patent.      Patented Oct. 10, 1905.

Application filed January 15, 1902. Serial No. 89,828.

*To all whom it may concern:*

Be it known that we, HIRAM PERCY MAXIM, residing at Pittsburg, in the county of Allegheny and State of Pennsylvania, and HERBERT W. ALDEN, residing at Hartford, in the county of Hartford and State of Connecticut, citizens of the United States, have invented a new and Improved Axle-End, of which the following is a specification, reference being had to the accompanying drawings, forming a part hereof.

This invention relates particularly to the ends of axles on automobiles, one design of which is shown in our Letters Patent No. 32,179, granted January 30, 1900. In the construction of automobiles it is usual that the axle carrying the steering-wheels is fixedly transverse and not of the fifth-wheel variety, so that in practice the springs supporting the body can be attached to this axle. With the motive mechanism on a vehicle the weight becomes much heavier than in the old horse-vehicles, and consequently necessitates the greater strength of axle; but in order to keep down the weight of the axle, and consequently the vehicle, it becomes desirable to attach the body, through the springs or otherwise, to the front axle as near the wheels as possible, so that the bending strain on the axle will be at a minimum, or in the attachment of other strain-exerting members to the axle-ends either below or above the axle proper, such as struts or ties, our invention combines great strength and convenience in manufacture. In addition, cheapness and simplicity are the all-important factors to be considered.

With these objects in view our invention combines one of the most satisfactory forms of suspending individual steering-wheels on fixedly-transverse axles, generally known as the "Elliott" steering device, with a means for supporting the load or any strains at the extreme end of the axle, producing an article of manufacture which meets these requirements and simplifies to an extreme their making, as by drop-forging or casting, obtaining in addition to the above practical advantages a theoretically most advantageous distribution of the strains involved, to more clearly set forth all of which reference is made to the drawings accompanying this and made a part hereof, showing a particular form of our axle-end, and the detailed description which follows.

Figure 1:
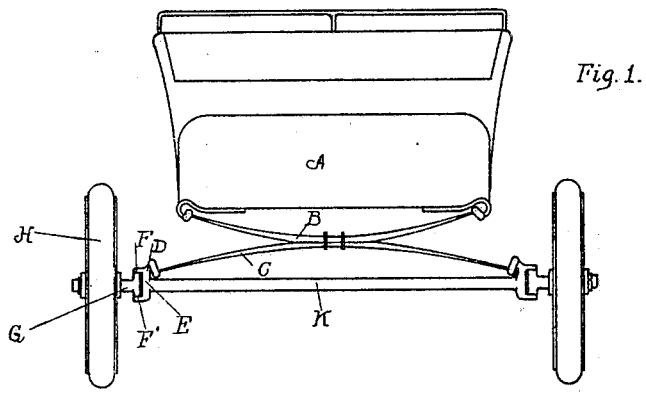
Figure 2:
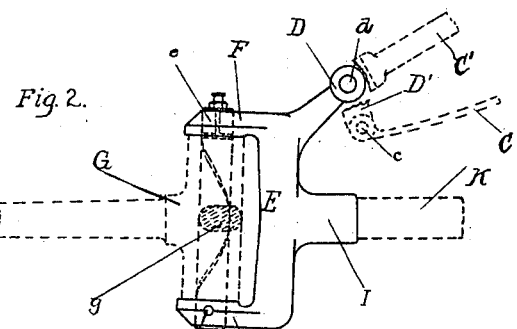
Figure 3:
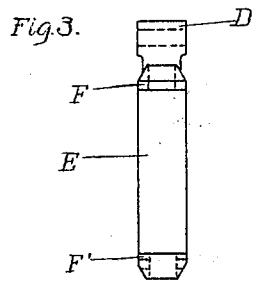
Figure 5:
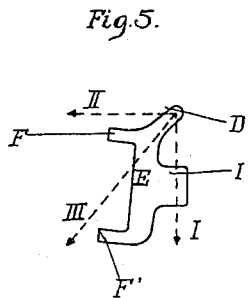
Figure 4:
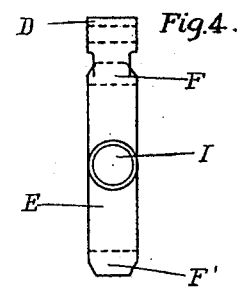

In the drawings, Figure 1 is a front view of an automobile. Fig. 2 is an elevation of the axle-end, showing in detail the construction and connection of parts. Figs. 3 and 4 are respectively end views from the left and right of Fig. 2. Fig. 5 is an outline view of an axle-end, with graphic illustration of the particular strains involved in form illustrated in Fig. 2.

The body A, supported by X-spring B, is carried by the ends C of the lower portion of the springs upon the tang D. This tang D is a part of the axle-end E, which has the arms F and F' projecting in the opposite direction from D and forming a bifurcated end or jaws which support a knuckle G with axle, on which is carried the wheel H, such means for supporting individually-pivoted steering-wheels being the well-known Elliott construction and commonly referred to as the "Elliott" steering device. G is pivoted between the jaws F and F' by means of bolt $e$, which, however, might be any other form of pintle, such as cones entered in any way in recesses or bearings in F F'. On the side of E opposite to F and F' is a projection by which E is secured to the main portion of the front axle K, which may be by any of the usual means, as brazing or welding, or it might be forged from the same piece. Spring end C is connected to D by a shackle D' by means of pins $d$ and $c$. On G is the arm $g$, (shown in section,) which may project either forwardly or rearwardly of the axle and by means of connections to the body permits operation by the occupant, so as to oscillate G in its bifurcated bracket to steer the vehicles through the wheels H.

It will be seen that if we follow the strains from the ground up through the wheels they are transmitted by the stub-axle and knuckle to E, while if followed from the vehicle through the springs the strains are transmitted to D, and by making this tang an integral portion of the axle end E the strain is transmitted to the same piece of metal that in turn transmits or takes the strains from the wheel. Various arrangements for supporting these X-springs on fixedly-transverse axles, as well as longitudinal springs on such axles, have been used, in many cases resulting in the bending or breaking of the axle, due to the transverse strains, which has led to a great variety of constructions of trussed axles, all of which sometimes double or treble that weight which would be required of the axle except for these strains and in addition greatly increasing the cost of manufacture.

In the functioning of the springs of that form which we show in our drawings it will be seen, as clearly set forth in Fig. 2, that upon the flattening of the spring the end must extend laterally, and with its shackle such motion is permitted; but by the shape and position of D it will be seen that the swing of the shackle-support is most advantageously accommodated at the same time with a normal position of the shackle which may approximate the vertical and in stable equilibrium. It will be clear from the above that the combining in the one-piece axle end of the several parts which support the other members of the vehicles which must be articulated in relation to the axle is accomplished with marked simplicity, cheapness, and strength. These advantages, however, are not alone incidental to the combination of spring-and-shackle construction in which our special axle end is shown, but a strut, such as C', (indicated in dotted outline in Fig. 2 as extending from the end of tang D,) represents another class of member which might be attached to our special form of axle end. Such an axle-end drop-forged in one piece is extremely easy to make and accomplishes that for which heretofore two or many more forgings with trussed front axle or other complicated construction were required.

In addition to the above, however, the technical advantages, or, it might be said, the most technical perfection which is involved in our invention, is clearly seen by reference to Fig. 5. The strain due to the weight of the body supported at D might be represented by I; but such a part as the axle-end of a vehicle is always made to carry the strains under excessive conditions, which in this instance might be when the vehicle at a considerable speed turns corners. Under such circumstances there will be a considerable centrifugal force and load concentrated in E, as the adhesion of the wheels prevents side slipping. This centrifugal force, as transmitted by C'' or through C, when its shackle swings out to engage with the tang, reaches D and might be represented by II. Thus in conditions of the greatest strain, which determines the proportion of the axle ends, the combined strains will result approximately as indicated at III. The inwardly-projecting tang D can thus, it will be seen, be proportioned as to size and obliquity, so that the resultant strain may intersect the axis or pintle of the steering-knuckles midway between its supports, which would give a perfect balance of the strains without any transverse strain in the axle; but even under normal conditions with excessive loads or in rough riding the attachment of any strain-carrying member to an axle end of our construction brings any purely transverse braking effect close to the end, thus relieving the main length of front axle and permitting its construction of lighter material than otherwise. With the bifurcated axle end and the projection I it will be seen that the axle K may be in alinement with the stub-axle on G, thus giving the least twisting or other strains, and in which the transverse strains carried by the pintle or post of G to the bracket of E are distributed equally on the upper and lower arms of the jaw, thus balanced about their center, which in Fig. 5 it is shown may be the point intersected by the resultant strains for which the axle end is constructed.

To still further simplify this form of individually-pivoted steering device, it will be seen in Fig. 2 that the pin $e$ is so constructed as to eliminate the necessity of any head or nuts by having holes in F and F' perfectly plain, into which it is inserted and held by a small pin $e'$. We prefer to taper $e'$, which is driven home and may be clenched, as a cotter. Thus in the arrangement the load is taken on a plain bearing on the lower side of F, which coacts with the upper surface of G, while the upper surface of F' is also plain, though usually not taking the wear. Therefore G can be slid between the substantially symmetrical opposed faces of F and F', $e$ inserted and locked in position by the single pin $e'$, the whole presenting an extremely simple construction.

The tang may of course be bent to accommodate any connection, or a different-shaped spring end, and it may be offset more or less, and other changes in the details of the construction may be made without, however, departing from the spirit of this invention.

What we claim, and desire to cover by Letters Patent, is—

1. As an article of manufacture, an axle-end comprising in one integral piece a substantially vertical body portion, stub-axle-supporting jaws projecting from one side of the body portion and an axle attachment and an upwardly and inwardly extending load or strain supporting tang projecting from the opposite side of the body portion, substantially as shown and described.

2. As an article of manufacture, an axle-end comprising in one integral piece a substantially vertical body portion, stub-axle-supporting jaws projecting from one side of the body portion and an axle attachment, an upwardly and inwardly extending load or strain supporting tang projecting from the opposite side of the body portion said jaws having alined holes and said tang having a transverse hole near its end, substantially as shown and described.

3. In a vehicle, an axle, an Elliott steering device comprising the jaws for the support of the stub-axle and independent steering-wheel, a plain pivot-pin carried by said jaws at each end of the axle, a single locking-pin to hold each pivot-pin in position, and a knuckle to oscillate on each pivot-pin, and a load and strain supporting tang extended upwardly and inwardly from the jaws at each end of the axle and integral therewith, substantially as shown and described.

In witness whereof we have duly subscribed our names.

H. PERCY MAXIM.
HERBERT W. ALDEN.

Witnesses for Maxim:
S. W. ROLLESTON,
D. P. RITCHEY.

Witnesses for Alden:
M. L. CLARK,
HERMAN F. CUNTZ.